US009193530B2

(12) United States Patent
Trudslev et al.

(10) Patent No.: US 9,193,530 B2
(45) Date of Patent: Nov. 24, 2015

(54) APPARATUS COMPRISING A HOPPER AND AN AUGER CONVEYOR FOR CONVEYING SOLID ITEM

(75) Inventors: Jens Trudslev, Tranbjerg J (DK); Jonas Ubbesen, Abyhoj (DK)

(73) Assignee: Tetra Laval Holdings & Finance S.A., Pully (CH)

(*) Notice: Subject to any disclaimer, the term of this patent is extended or adjusted under 35 U.S.C. 154(b) by 0 days.

(21) Appl. No.: 14/008,157

(22) PCT Filed: Mar. 27, 2012

(86) PCT No.: PCT/DK2012/050090
§ 371 (c)(1),
(2), (4) Date: Sep. 27, 2013

(87) PCT Pub. No.: WO2012/130242
PCT Pub. Date: Oct. 4, 2012

(65) Prior Publication Data
US 2014/0014475 A1    Jan. 16, 2014

(30) Foreign Application Priority Data
Mar. 28, 2011    (DK) .................................. 2011 70144

(51) Int. Cl.
*B65G 33/14*    (2006.01)
*B65G 65/46*    (2006.01)

(52) U.S. Cl.
CPC ................ *B65G 33/14* (2013.01); *B65G 65/46* (2013.01)

(58) Field of Classification Search
CPC ........ B65G 33/00; B65G 33/24; B65G 65/46; B65G 2812/0618; B65G 2812/0627; B65G 2812/06; B65G 47/18; B65G 33/14; A01K 5/0258

USPC ............................ 198/550.1, 550.6, 658, 671
See application file for complete search history.

(56) References Cited

U.S. PATENT DOCUMENTS 1,423,698 A    7/1922   Thurston
2,233,707 A *  3/1941   Nelson ...................... 198/550.1
(Continued)

FOREIGN PATENT DOCUMENTS

DE    19917470    10/2000
DE    19937415    2/2001
(Continued)

OTHER PUBLICATIONS

International Search Report issued by the European Patent Office in corresponding International Application No. PCT/DK2012/050090, dated Jun. 19, 2012.

*Primary Examiner* — Leslie A Nicholson, III
*Assistant Examiner* — Keith R Campbell
(74) *Attorney, Agent, or Firm* — Finnegan, Henderson, Farabow, Garrett & Dunner, LLP

(57) ABSTRACT

An apparatus is disclosed comprising a hopper and an auger conveyor for conveying solid items, wherein the auger conveyor comprises an auger and an outlet pipe enclosing the auger along at least a part of the length of the auger, the outlet pipe having an inlet end and an outlet end, wherein the outlet pipe is mounted at its inlet end to the hopper for receiving solid items from the hopper through an outlet opening near the bottom of the hopper, and the auger extends partly along at least a part of the bottom of the hopper, partly inside the outlet pipe along substantially the full length thereof, and wherein at least a part of the inner surface of the hopper above the outlet opening is inclined towards the direction of conveyance of the auger conveyor.

17 Claims, 9 Drawing Sheets

(56) References Cited

U.S. PATENT DOCUMENTS

Figure 1:
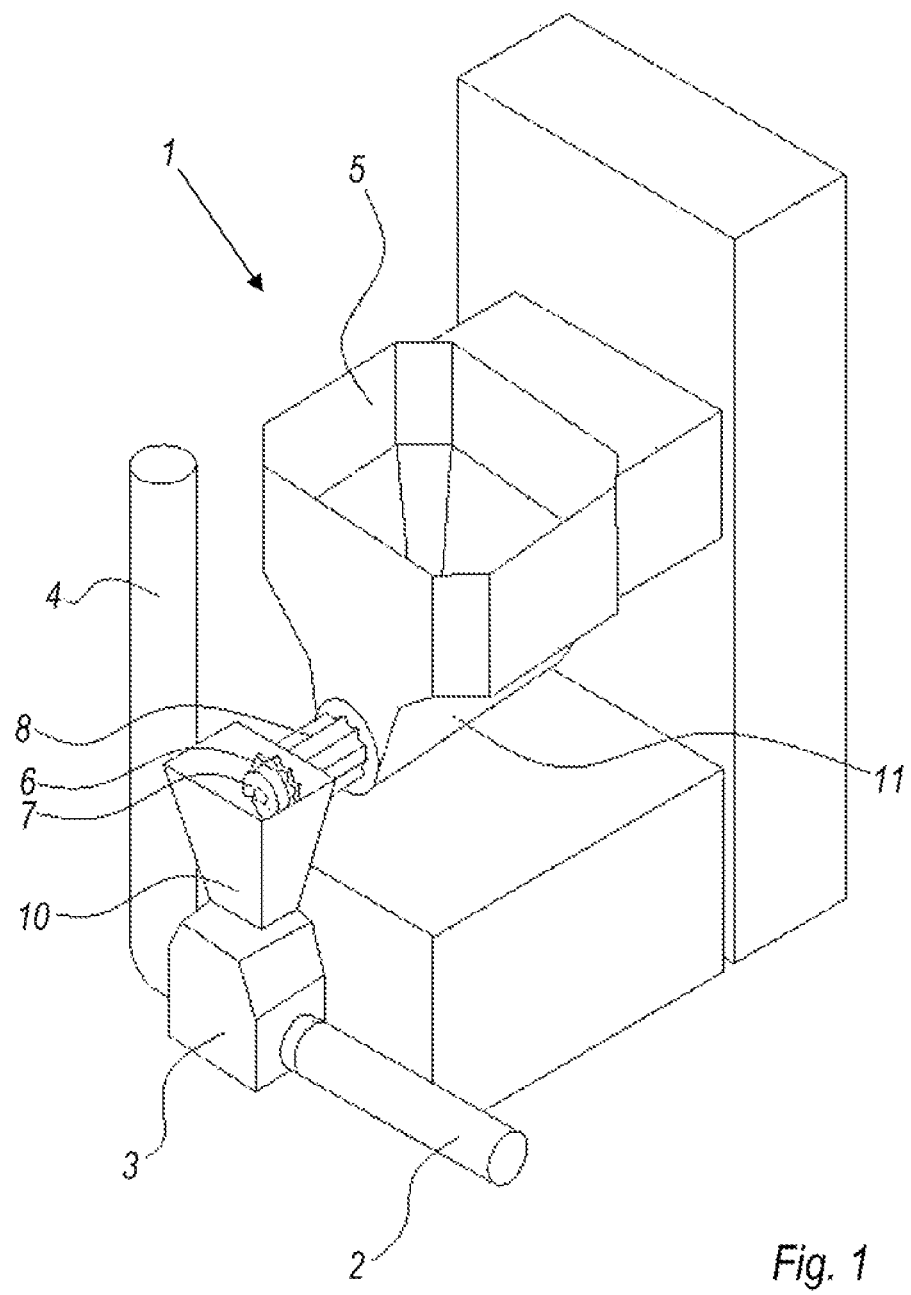

| | | | | |
|---|---|---|---|---|
| 3,093,271 | A | * | 6/1963 | Douglas ................ 222/413 |
| 3,104,020 | A | * | 9/1963 | Klapp .................... 406/61 |
| 3,123,050 | A | * | 3/1964 | Haen ..................... 119/57.6 |
| 3,194,385 | A | * | 7/1965 | Barnese ................. 198/550.1 |
| 3,251,453 | A | * | 5/1966 | Robson, Jr. ........... 198/550.1 |
| 3,337,026 | A | * | 8/1967 | Steele et al. .......... 198/670 |
| 4,850,515 | A | * | 7/1989 | Cleland ................. 222/161 |
| 5,337,658 | A | * | 8/1994 | Bruke .................... 100/127 |
| 5,498,115 | A | * | 3/1996 | Perneborn ............. 414/326 |
| 6,015,228 | A | * | 1/2000 | Muller et al. .......... 366/186 |
| 6,539,743 | B2 | * | 4/2003 | Jones .................... 62/381 |
| 7,461,763 | B1 | | 12/2008 | Winn |
| 2010/0186609 | A1 | * | 7/2010 | Svedberg ............... 100/337 |

FOREIGN PATENT DOCUMENTS

| | | | |
|---|---|---|---|
| EP | 0841268 | | 5/1998 |
| FR | 1433276 | * | 4/1966 |
| FR | 1434276 | | 4/1966 |
| JP | 52047285 | | 4/1977 |
| JP | 54042783 | | 4/1979 |
| RU | 2177693 | | 1/2002 |

* cited by examiner

APPARATUS COMPRISING A HOPPER AND AN AUGER CONVEYOR FOR CONVEYING SOLID ITEM

CROSS-REFERENCE TO RELATED APPLICATIONS

This is a U.S. National Phase Application of International Application No. PCT/DK2012/050090, filed Mar. 27, 2012, which claims the benefit of priority to Denmark Patent Application No. PA 2011 70144, filed Mar. 28, 2011, which is incorporated herein by reference.

FIELD OF THE INVENTION

The present invention relates to an apparatus comprising a hopper and an auger conveyor for conveying solid items, such as an apparatus for the production of ice cream mass with solid ingredients.

BACKGROUND OF THE INVENTION

In the production of frozen ice cream mass with solid ingredients, it is well-known to use an auger conveyor for conveying the solid ingredients from a hopper to a pump, which may for instance be a lamella pump or a piston pump, by means of which the solid ingredients are mixed into a flow of ice cream mass.

It is also known to use auger conveyors having augers with increasing pitch and/or decreasing core diameter along the direction of conveyance. This results in an increasing volume along the auger, which assures that the amount of solid ingredients entering the auger conveyor is more evenly distributed across the hopper, whereas an auger with a constant pitch and core diameter will typically be filled shortly after its starting point, meaning that almost no ingredients will be drawn from the other side of the hopper.

However, even with such measures having been taken, it has proven to be difficult to avoid clogging and lumping of the ingredients and damage to fragile types of ingredients, especially at the outlet from the hopper to the auger conveyor, which in turn results in an uneven dosing of the ingredients at the end of the auger conveyor.

BRIEF DESCRIPTION OF THE INVENTION

It is an object of the present invention to provide a solution to this problem by providing an apparatus with a substantial reduction of the clogging and lumping of the ingredients and of the damage to fragile types of ingredients, thus resulting in a substantial improvement of the evenness of the dosing of solid ingredients from the auger conveyor, the ingredients falling from the conveyor in a free flow and in small portions.

The present invention relates to an apparatus comprising a hopper and an auger conveyor for conveying solid items, wherein the auger conveyor comprises an auger and an outlet pipe enclosing the auger along at least a part of the length of the auger, the outlet pipe having an inlet end and an outlet end, wherein the outlet pipe is mounted at its inlet end to the hopper for receiving solid items from the hopper through an outlet opening near the bottom of the hopper, and the auger extends partly along at least a part of the bottom of the hopper, partly inside the outlet pipe along substantially the full length thereof, and wherein at least a part of the inner surface of the hopper above the outlet opening is inclined towards the direction of conveyance of the auger conveyor.

Letting a part of the inner surface above the outlet opening incline like described above substantially reduces the risk of solid items being stuck, squeezed and/or damaged at the upper edge of the outlet opening. Especially for fragile items such as some solid ingredients to be mixed into an ice cream mass, this configuration of the inner surface of the hopper significantly reduces the amount of items being stuck and/or crushed when entering the outlet pipe from the hopper.

It should be noted that in the present document, the word "solid" used in expressions like "solid items" and "solid ingredient" is meant to include viscous substances like for instance jams or marmalades, which may not be categorised as "solids" in other contexts.

In an embodiment of the invention, said inclined part of the inner surface of the hopper forms an angle with respect to the vertical in the range from 20° to 88°, preferably in the range from 45° to 85°, most preferably in the range from 55° to 75°.

Angles within these ranges have proved to result in the largest reduction of the amount of solid items getting stuck and/or crushed when entering the outlet pipe from the hopper.

In an embodiment of the invention, the pitch of the auger increases, gradually or stepwise, along the direction of conveyance of the auger conveyor.

In a further embodiment of the invention, the most significant increase of the pitch of the auger takes place at a point just inside an outlet channel of the hopper.

In an embodiment of the invention, the auger comprises a central core from which one or more helical screw flights extend, and the diameter of the core decreases, gradually or stepwise, along the direction of conveyance of the auger conveyor.

In a further embodiment of the invention, the most significant decrease of the diameter of the central core of the auger takes place at a point just inside an outlet of the hopper.

Within the hopper, the use of augers with increasing pitch and/or decreasing core diameter along the direction of conveyance results in the amount of solid ingredients entering the auger conveyor being more evenly distributed across the hopper. Within the outlet pipe, the use of an increasing pitch and/or a decreasing core diameter is also advantageous because it results in an increasing volume available for conveyance of the solid ingredients without introduction of any more solid ingredients. This contributes to loosing up any lumps or tendencies to clogging of the ingredients and in turn results in a more even dosing of the ingredients at the end of the auger conveyor. In the outlet channel of the hopper, an increasing volume is especially important in order to avoid clogging or squeezing of the ingredients entering the outlet pipe from the hopper. Therefore, it is advantageous to let the pitch increase and/or to let the diameter of the core decrease extra much at this location.

In an embodiment of the invention, at least along a part of the length of the outlet pipe enclosing the auger, the cross-sectional outline of the inner side of the outlet pipe is a circular shape being superposed by a plurality of undulations.

The use of outlet pipes with such undulations has proved to result in less damage of the solid ingredients during conveyance through the outlet pipe because the solid ingredients are pushed more gently towards the outlet end of the outlet pipe, and in the breaking up of lumps of solid ingredients rather than formation of lumps due to solid ingredients being pressed together.

This seems to be due to at least two features of the undulations. Firstly, the increasing volume around the auger without introduction of any more solid ingredients helps loosing up any lumps or tendencies to clogging of the ingredients. Secondly, the parts of the undulations extending towards the centre of the outlet pipe function as guides helping to "arrange" the solid ingredients in a proper way so that they are more easily being conveyed through the outlet pipes without being rotated with the auger.

Thus, the use of such outlet pipes has proved to result in substantially less clogging and lumping of the ingredients and damage to fragile ingredients, which in turn reduces the variation in the dosing of solid ingredients from the auger conveyor over time, the variation being represented by the standard deviation of the dosing flow delivered by the auger conveyor and measured as weight unit per time unit.

In an embodiment of the invention, the undulations extend parallel to the longitudinal direction of the outlet pipe.

In an embodiment of the invention, the undulations are equally spaced around the outlet pipe.

In an embodiment of the invention, the undulations are sinusoidal.

For production purposes, it is convenient to make the outlet pipes with undulations that extend parallel to the longitudinal direction of the pipe and, equally spaced and of sinusoidal shape, although similar results may be obtained as well with undulations constructed otherwise, such as with sharp edges or by arranging profiles on the inner side of a larger, cylindrical pipe, for instance by welding.

In an embodiment of the invention, the number of undulations is in the range from 2 to 20, preferably in the range from 6 to 12, most preferably in the range from 7 to 9.

Numerous tests have proved that the optimum results are obtained if the number of undulations falls within these ranges.

In an embodiment of the invention, the part of the auger extending along at least a part of the bottom of the hopper is placed in an outlet channel, which outlet channel is constituted by a trench extending along the bottom of the hopper and ending at the outlet opening, wherein the cross-sectional outline of the trench is formed by a number of straight lines, the angle between two neighbouring lines of which is obtuse.

Placing the auger in a trench having an outline as described above results in a more gentle transportation of the solid ingredients through the outlet channel without being rotated with the auger. This seems to be due to the fact that such angular shapes of the outlet channel help to "arrange" the solid ingredients in a proper way so that they are more easily being conveyed through the outlet channel.

In an embodiment of the invention, the outlet channel is asymmetric and comprises a rejector profile on the inlet side of the auger and extending parallel to the auger.

A rejector profile along the inlet side of the auger is useful for preventing solid ingredients from the hopper from being squeezed and damaged when entering the auger.

In an embodiment of the invention, the position of the auger in the outlet channel is displaced towards the inlet side of the auger with respect to the centre line of the outlet channel.

An asymmetric position of the auger results in additional space on one side of the auger, which has proven to result in a more gentle transportation of the solid ingredients through the outlet channel.

In an embodiment of the invention, the outlet pipe at its outlet end is cut off vertically at an angle with respect to the longitudinal direction of the outlet pipe, which angle is in the range from 20° to 80°, preferably in the range from 40° to 75" most preferably in the range from 50° to 70°.

Letting the outlet pipe be cut off vertically at its outlet end at an angle with respect to the longitudinal direction of the pipe within these ranges has proved to further increase the evenness of the dosing of solid ingredients falling off the outlet end of the outlet pipe, especially when using an undulated outlet pipe as described above. This is due to the fact that the solid ingredients fall off the outlet pipe from two or more of the undulations placed at the underside of the outlet pipe, leading to less pulsation in the dosing of solid ingredients from the outlet pipe.

In an embodiment of the invention, the outlet pipe enclosing the auger is made from steel.

Making the outlet pipe from steel is advantageous that steel is an easily processable material, which is also approved for use with foodstuff.

In an embodiment of the invention, the apparatus is an apparatus for the production of ice cream mass with solid ingredients.

An auger conveyor and an apparatus as described above are very suitable for delivering solid ingredients to a lamella pump or the like for being mixed into a frozen ice cream mass.

FIGURES

Figure 2A:
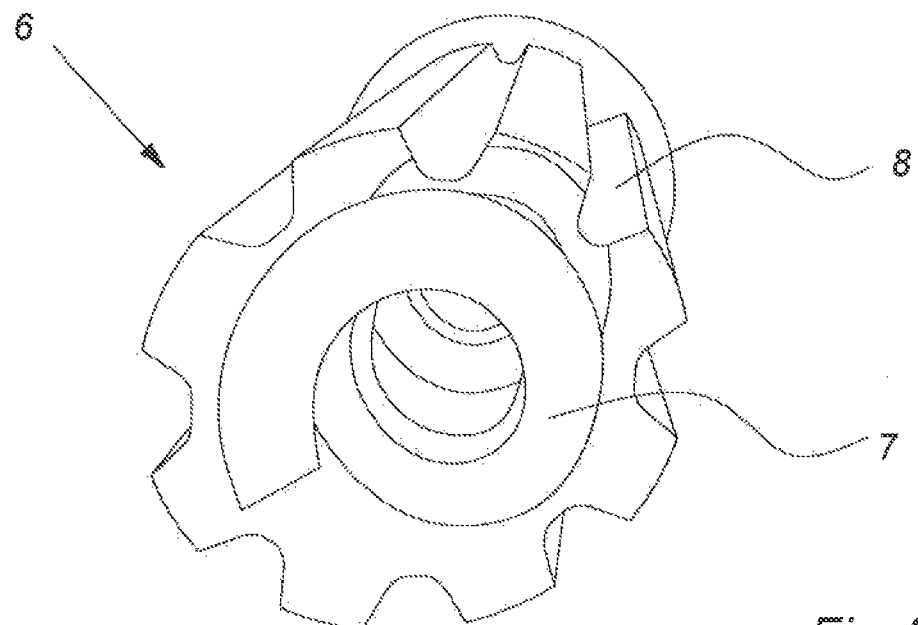
Figure 2B:
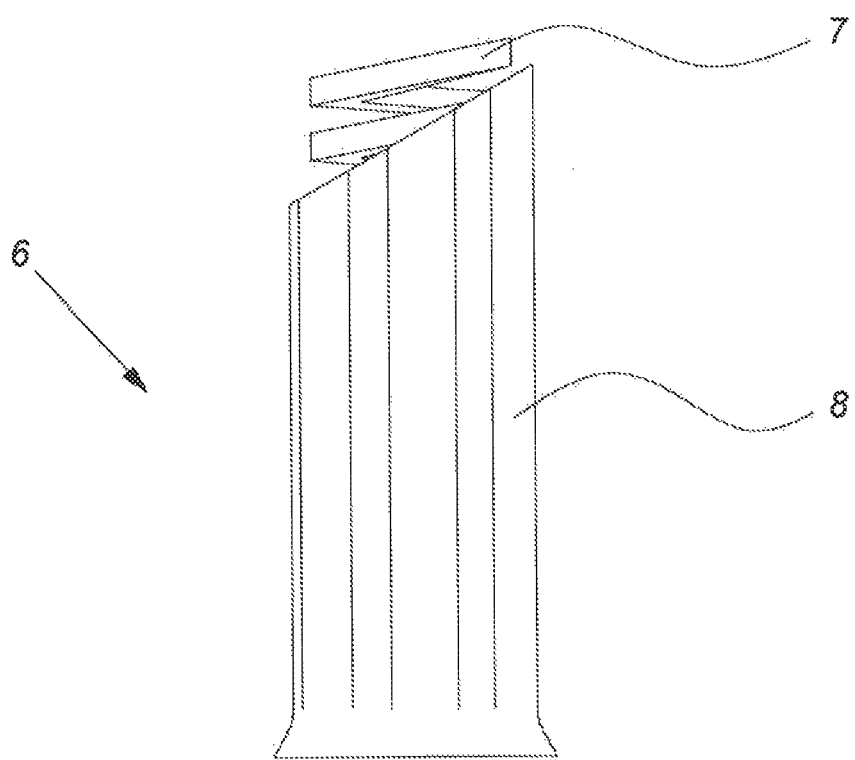
Figure 3A:
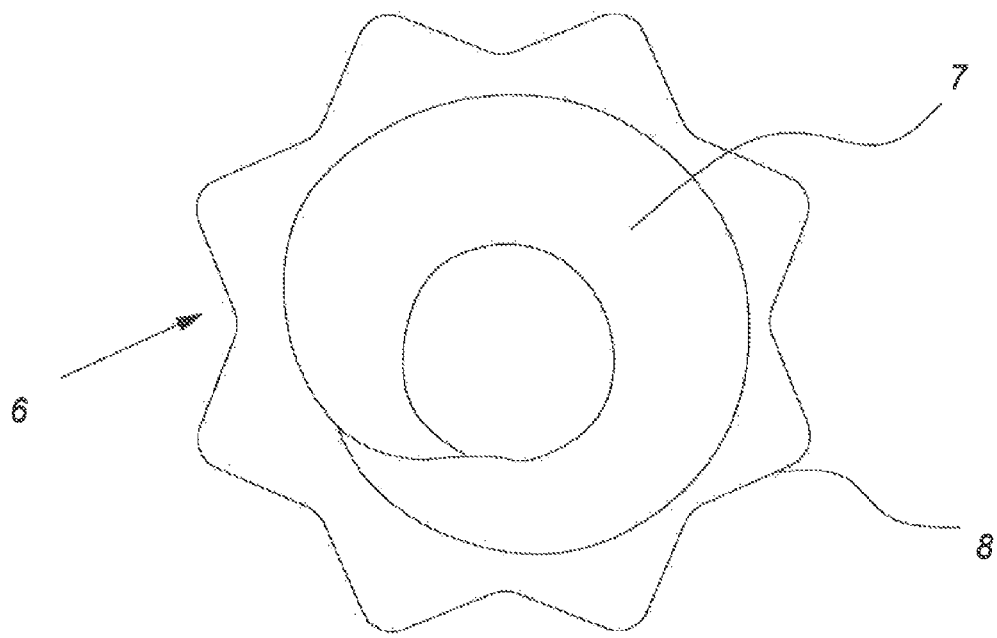
Figure 3B:
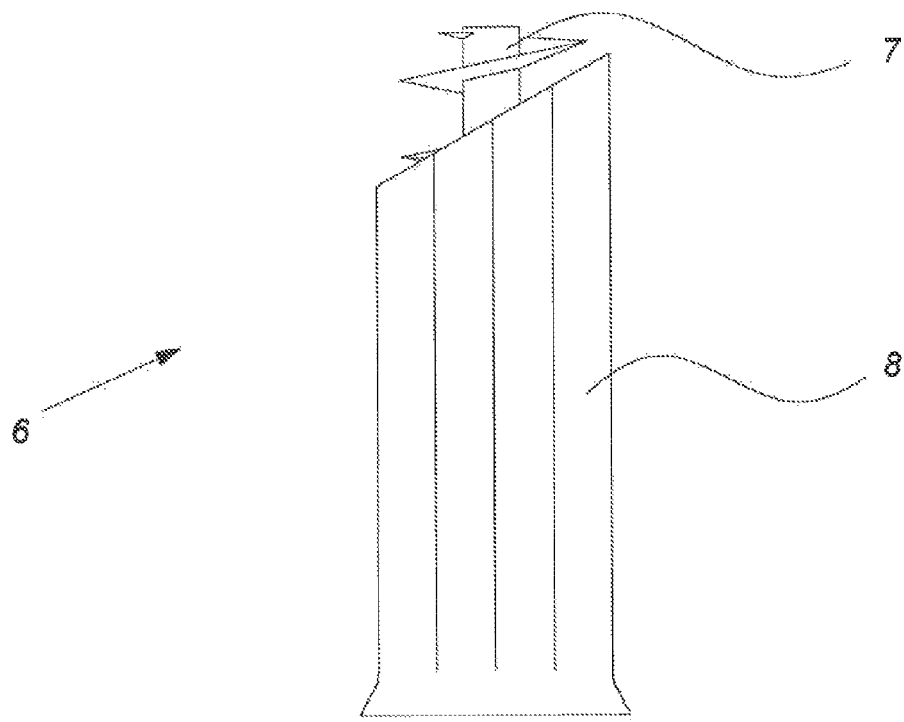
Figure 4A:
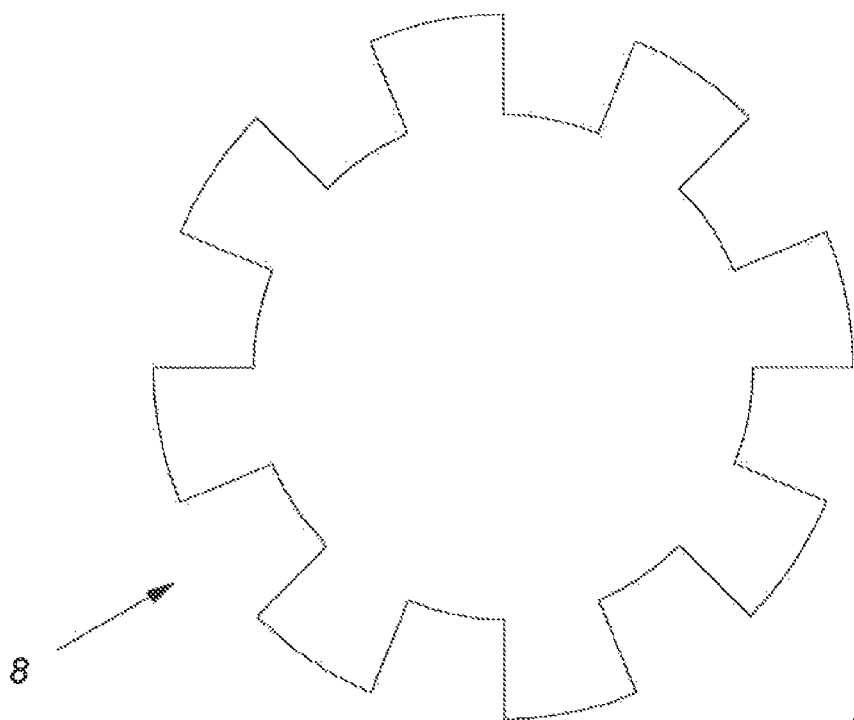
Figure 4B:
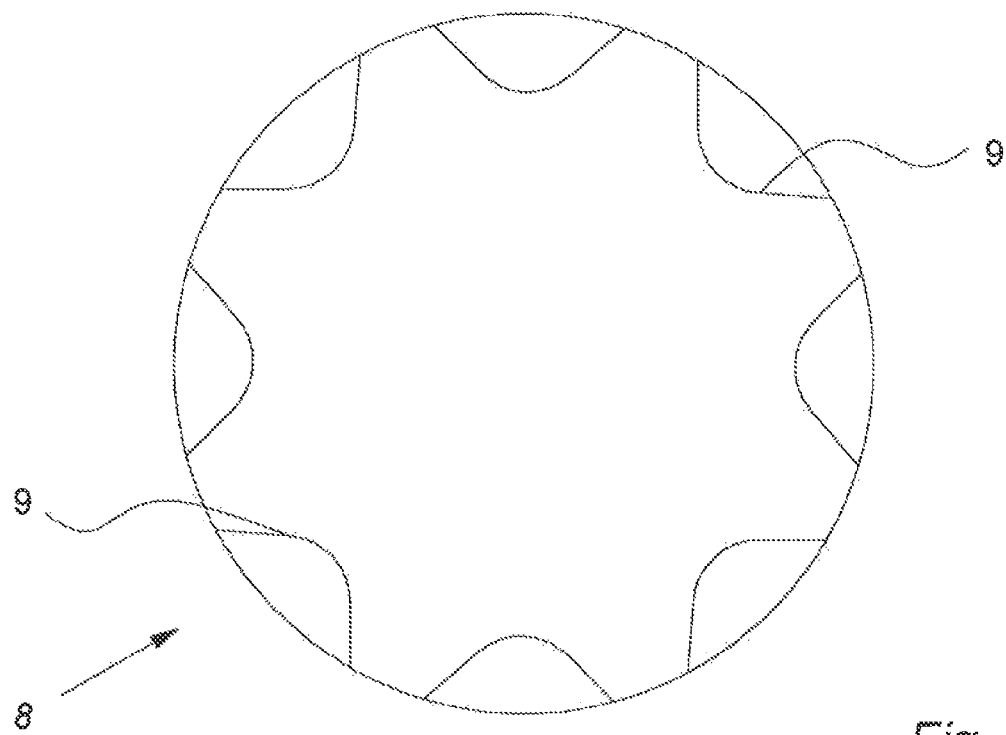
Figure 5A:
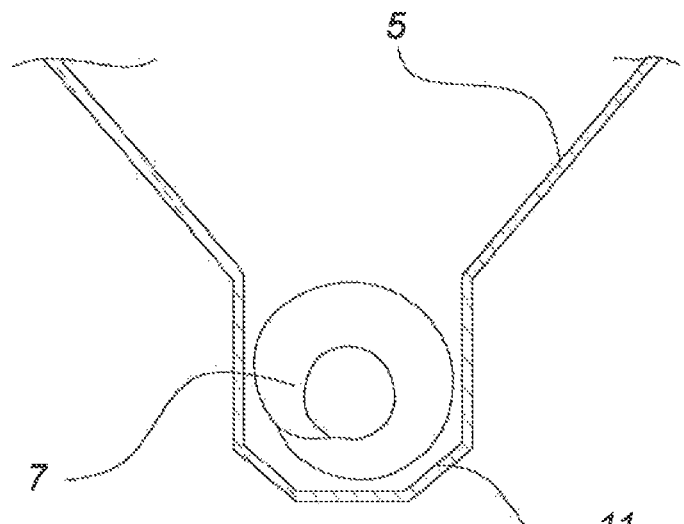
Figure 5B:
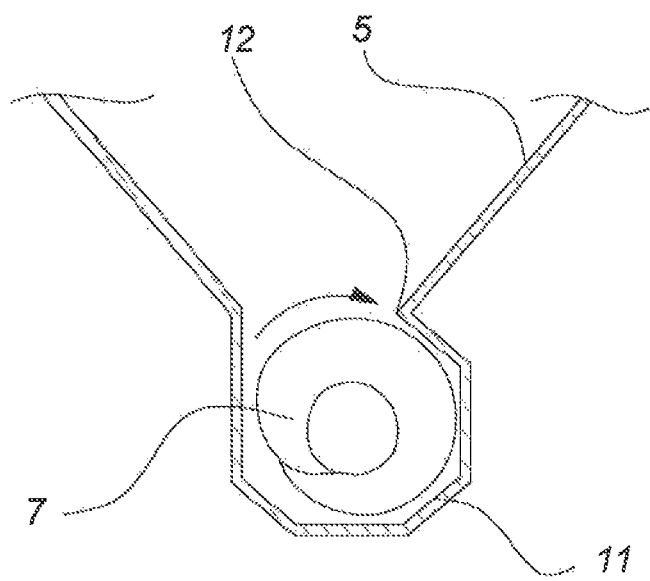
Figure 6A:
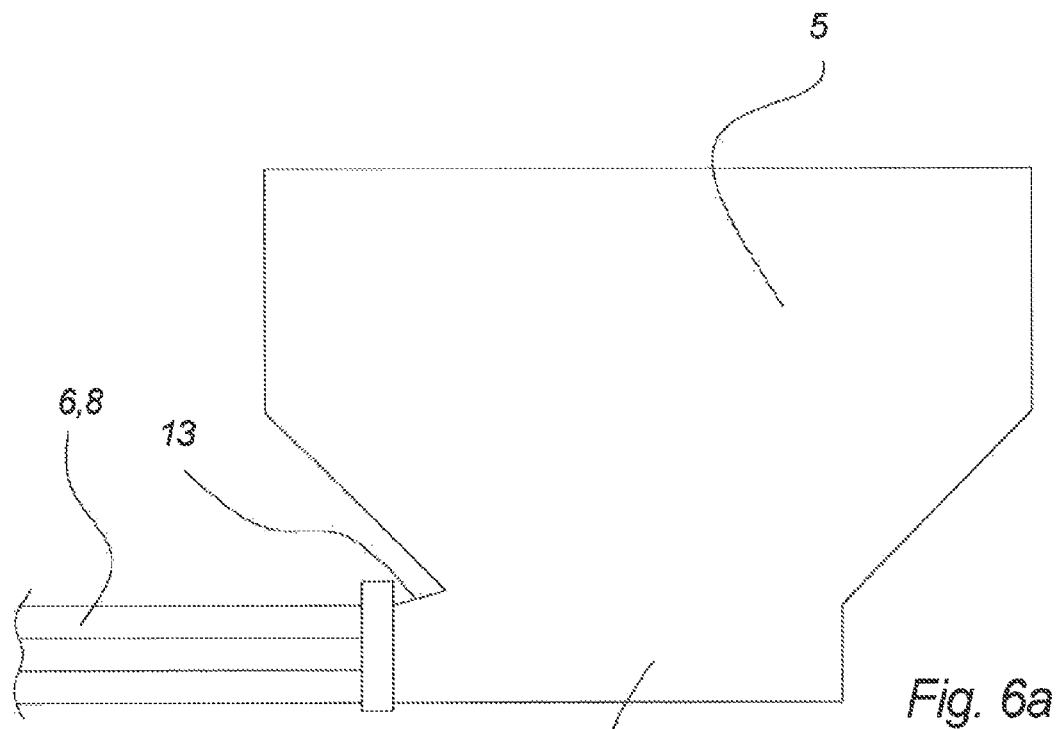
Figure 6B:
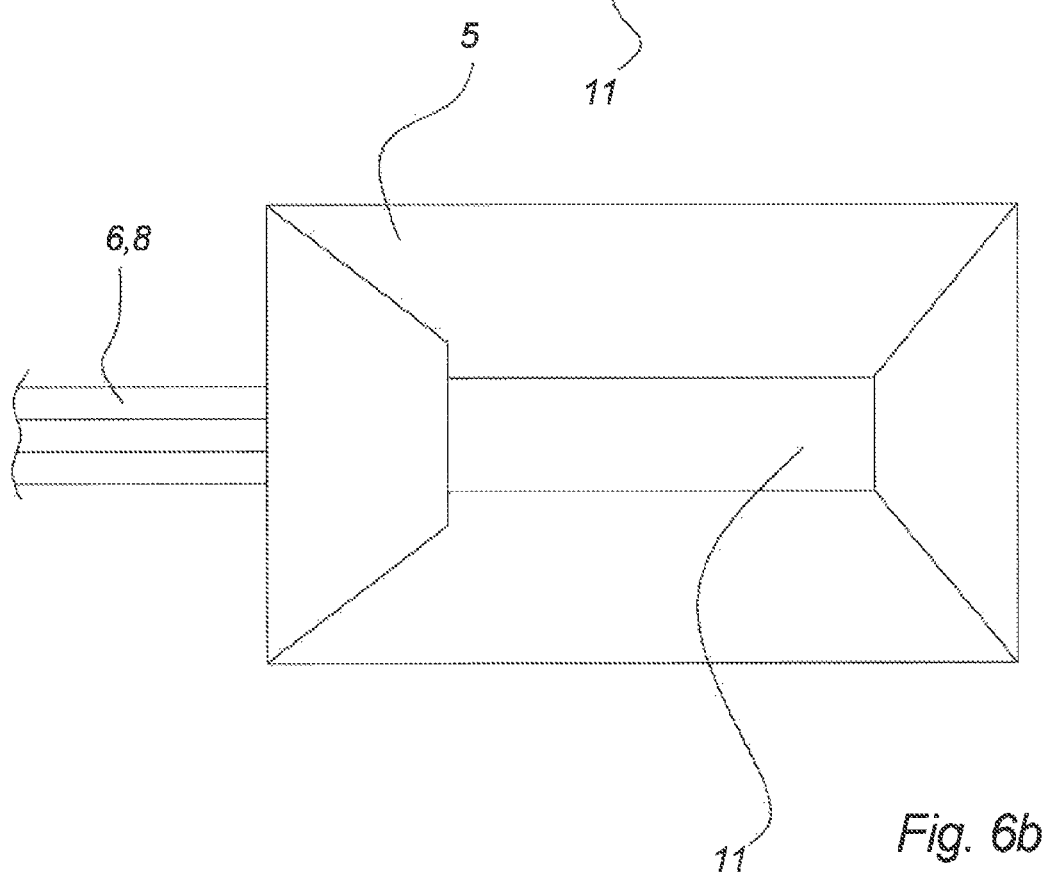
Figure 7:
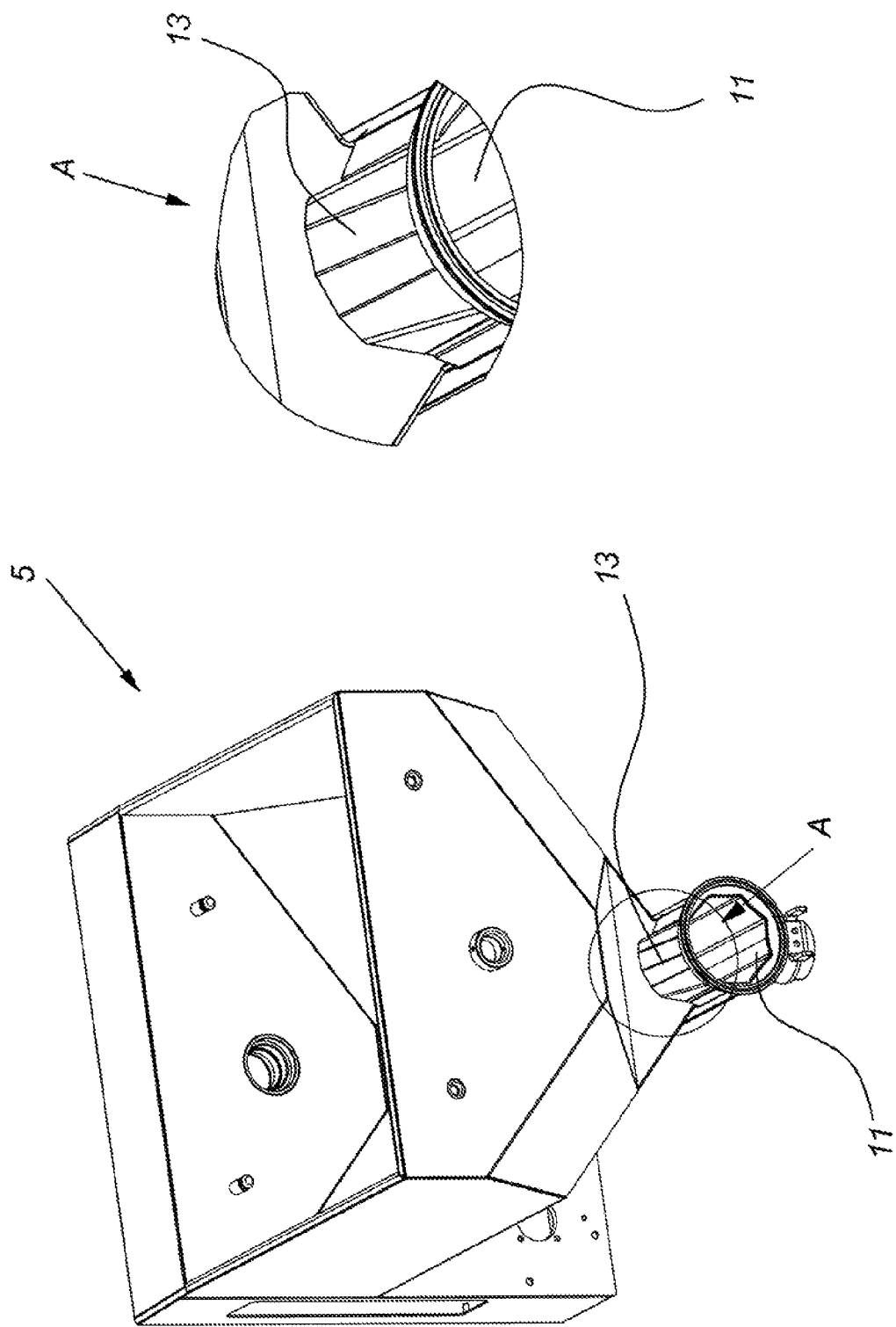
Figure 8:
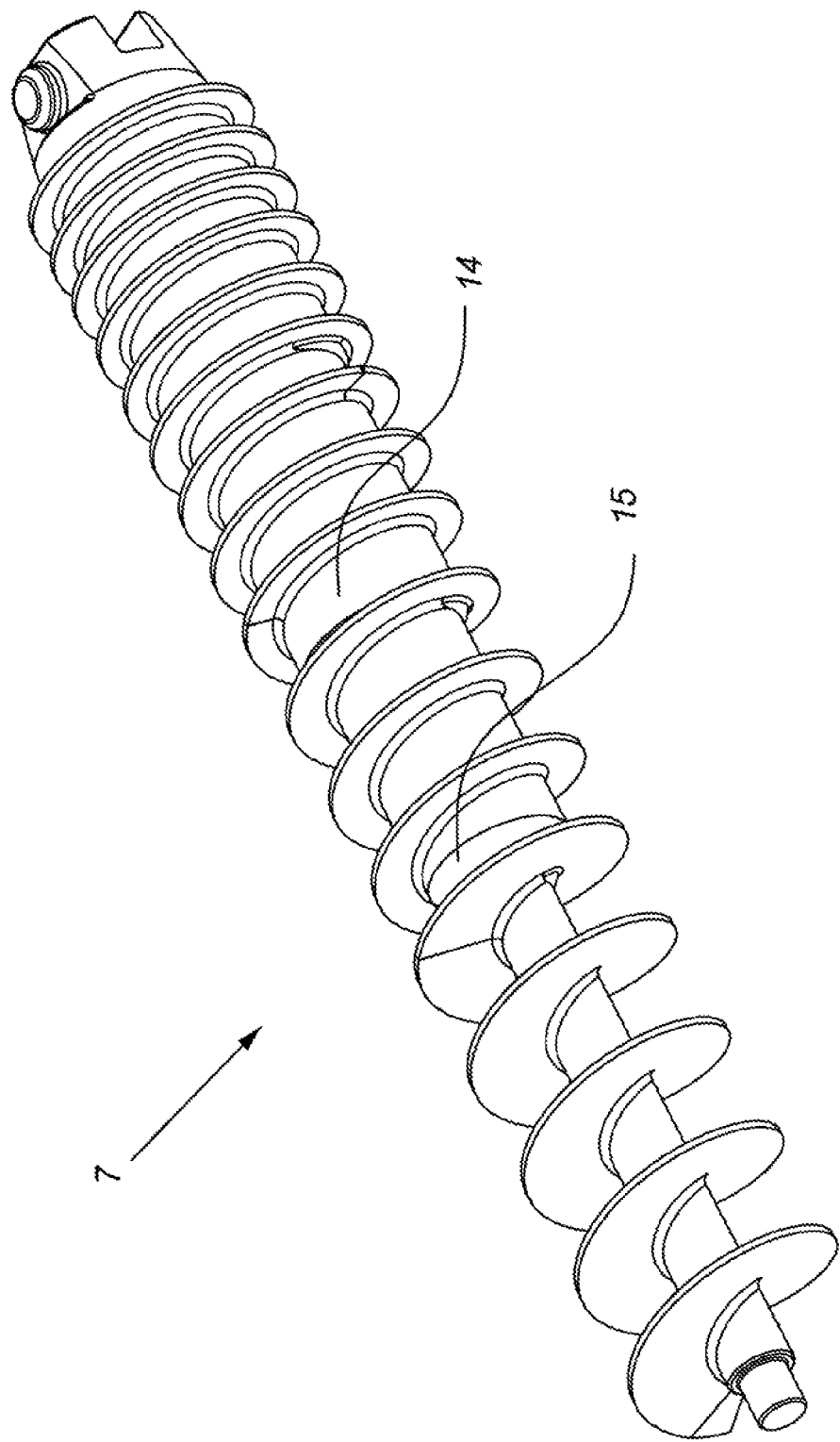
Figure 9:
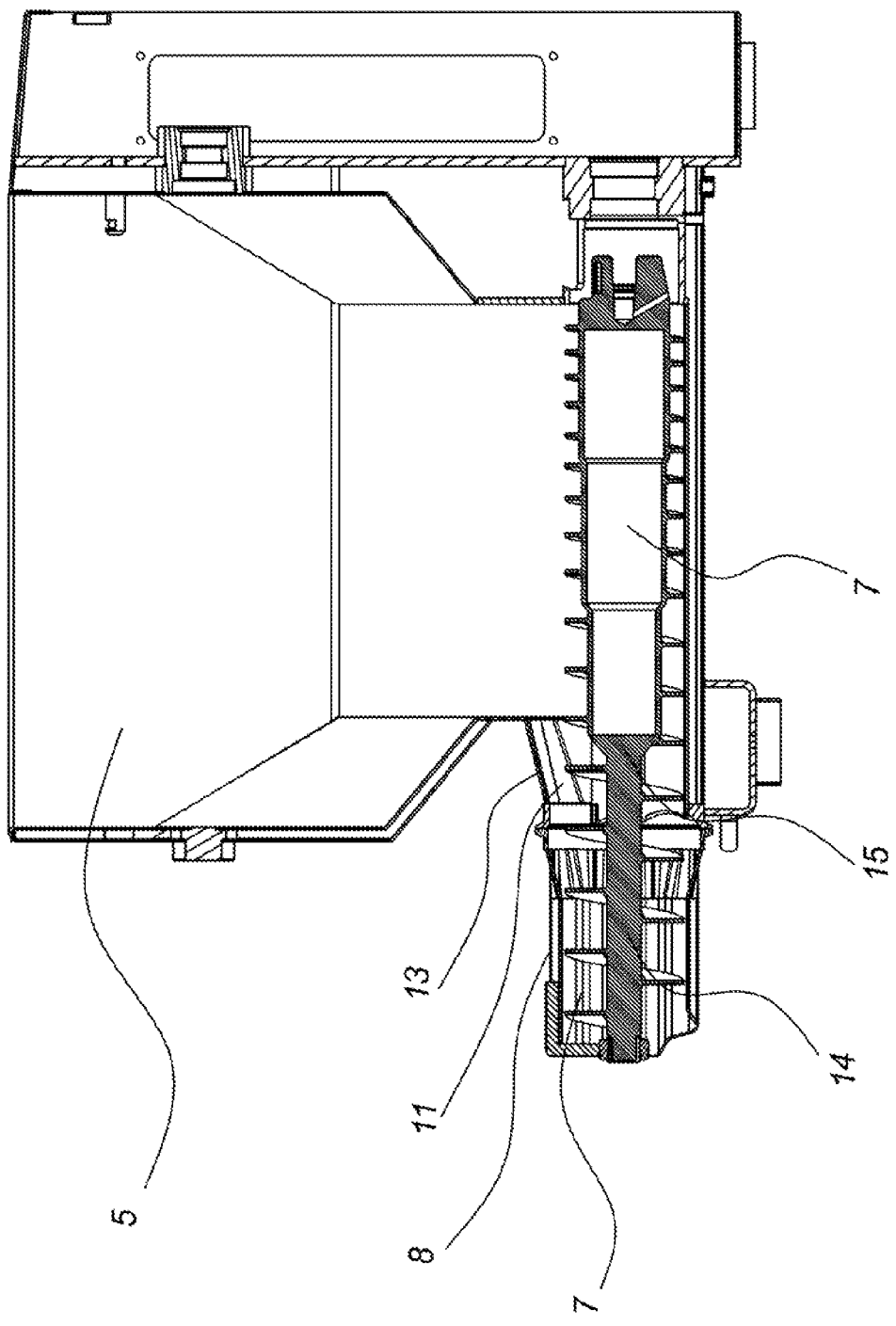

A few exemplary embodiments of the invention will be described in the following with reference to the figures, of which FIG. 1 is a schematic overview of an apparatus according to an embodiment of the invention, FIG. 2a is a perspective view of an auger conveyor according to an embodiment of the invention as seen from the outlet end of the outlet pipe, FIG. 2b is a schematic top view of the same auger conveyor, FIG. 3a is a perspective view an auger conveyor according to another embodiment of the invention as seen from the outlet end of the outlet pipe, FIG. 3b is a schematic top view of the same auger conveyor, FIG. 4a illustrates schematically the cross-section of an outlet pipe according to an embodiment of the invention, FIG. 4b illustrates schematically the cross-section of an outlet pipe according to another embodiment of the invention, FIG. 5a is a cross-sectional view illustrating schematically the outline of an outlet channel of an apparatus according to an embodiment of the invention, FIG. 5b is a cross-sectional view illustrating schematically the outline of an outlet channel of an apparatus according to another embodiment of the invention, FIG. 6a is a schematic cross-sectional view of a hopper and an outlet pipe of an apparatus according to an embodiment of the invention, FIG. 6b is a schematic top view of the same hopper and outlet pipe, FIG. 7 is a perspective view of a hopper of an apparatus according to an embodiment of the invention, FIG. 8 is a perspective view of an auger of an apparatus according to an embodiment of the invention, and FIG. 9 is a side view of an apparatus according to an embodiment of the invention comprising the hopper shown in FIG. 7 and the auger shown in FIG. 8.

DETAILED DESCRIPTION OF THE INVENTION

FIG. 1 illustrates schematically an apparatus 1 according to an embodiment of the invention. The illustrated apparatus is an apparatus 1 for mixing, solid ingredients (not shown), such as for instance fruit pieces, chocolate pieces or flakes, nuts, cookies or lumps of frozen jam, into a flow of at least partly frozen ice cream mass (not shown).

The mixing process is performed by a lamella pump 3 to which the frozen ice cream mass arrives through an inlet conduit 2. The solid ingredients enters the lamella pump 3 through a top funnel 10, and the frozen ice cream mass containing the solid ingredients leaves the lamella pump 3 and the apparatus 1 through an outlet conduit 4.

Before being mixed into the frozen ice cream mass, the solid ingredients are stored in a hopper 5, which at its bottom is provided with an outlet channel 11. An auger conveyor 6 conveys the solid ingredients from the outlet channel 11 of the hopper 5 to the top funnel 10 of the lamella pump 3 by means of an auger 7 extending partly through the outlet channel 11, partly through an outlet pipe 8, which at its inlet end is mounted to the hopper 5 and at its outlet end terminates in the top funnel 10 of the lamella pump 3.

The geometry of the hopper 5, especially with regard to the outlet channel 11 thereof, the auger 7 and the outlet pipe 8 are all optimized in order to handle the solid ingredients in a gentle way without pressing them together or damaging them. These geometries also influence the evenness of the dosing of solid ingredients to the top funnel 10 of the lamella pump 3 and, thus, the evenness of the distribution of solid ingredients in the frozen ice cream mass leaving the apparatus through the outlet conduit 4.

As for the design of the auger 6, it is well-known to use auger conveyors 6 having augers 7 with increasing pitch and, if the auger 7 is of the type having a central core, with decreasing core diameter along the direction of conveyance. In the outlet pipe 8, the increasing volume available for conveyance of the solid ingredients obtained thereby reduces the amount of clogging and lumping of the ingredients, which in turn results in a more even dosing of the ingredients at the end of the auger conveyor 6.

The apparatus 1 shown in FIG. 1 deviates from previously known systems in that the inner side of the outlet pipe 8 is not cylindrical in shape but has a circular cross-sectional outline, which is superposed by a plurality of undulations as indicated in the figure. Furthermore, the outlet pipe 8 is cut off vertically at its outlet end, i.e. in the top funnel 10 of the lamella pump 3, at an angle with respect to the longitudinal direction of the outlet pipe 8, which is less than 90°, and the cross-sectional outline of the outlet channel 11 at the bottom of the hopper 5 also differs from being circular, which cannot be seen in FIG. 1, however.

The dosing of solid ingredients may be controlled by weighing the hopper 5 several times per second by means of a number of weighing cells (not shown) and regulating the speed of the auger conveyor 6 in response to the results of these weighings.

FIG. 2a is a perspective view of an auger conveyor 6 according to an embodiment of the invention as seen from the outlet end of the outlet pipe 8. The illustrated auger 7 is of a helical type without any central core, and the generally seen cylindrical outlet pipe 8 is provided with eight undulations, each of which extends along the outlet pipe 8 running parallel to the longitudinal direction thereof. This modified shape of the outlet pipe 8 has shown to result in the solid ingredients being pushed more gently towards the outlet end of the outlet pipe 8 and in the breaking up of lumps of solid ingredients rather than formation of lumps due to solid ingredients being pressed together.

The optimum number, shape and size of these undulations may vary depending, on the size and type of solid ingredients to be conveyed by the auger conveyor 6, but numerous tests have shown that, in general, the best results are obtained using about eight undulations equally spaced around the outlet pipe 8.

Although the outlet pipe 8 is made from steel in some preferred embodiments, it can as well be made from other materials. For instance, it may be milled out from a suitable plastic material.

In FIG. 2b, which is a schematic top view of the same auger conveyor 6 as shown in FIG. 2a, it is clearly illustrated how the outlet pipe 8 is cut off at its outlet end with a vertical cut, which is inclined in relation to the longitudinal direction of the outlet pipe 8. This means that the solid ingredients, which are pushed out through the outlet end of the outlet pipe 8 by the auger 7, will fall off the outlet pipe 8 from two or more of the undulations placed at the underside of the outlet pipe 8, leading to less pulsation in the dosing of solid ingredients from the outlet pipe 8.

FIGS. 3a and 3b similarly illustrate another embodiment of an auger conveyor 6 according to the invention, in which the auger 7 is of the type having a central core from which a helical screw flight extends, and the undulations in the outlet pipe 8 is of a more sinusoidal character than the ones shown in FIGS. 2a and 2b.

FIGS. 4a and 4b illustrate schematically the cross-sections of two other embodiments of an outlet pipe 8. In FIG. 4a, the outlet pipe 8 is formed with sharp-edged undulations, whereas in FIG. 4b, the undulations have been formed by arranging a plurality of undulation profiles 9 on the inner side of a larger, cylindrical pipe, for instance by welding.

It should be noted that although the undulations shown in FIGS. 2a, 2b and 3b all extend parallel to the longitudinal direction of the outlet pipe 8, the undulations in other embodiments of the invention may extend in directions that are not parallel with the longitudinal direction of the outlet pipe 8 so that they tend more or less to wind around the outlet pipe 8.

It should also be noted that although the undulations shown in FIGS. 2a-4b all are equally spaced around the outlet pipe 8, this may not necessarily be the case in other embodiments of the invention. In some embodiments, for instance, the undulations may be arranged in the lower half of the outlet pipe 8 only.

FIG. 5a is a cross-sectional view of an outlet channel 11 of an apparatus 1 according to the invention illustrating how the outline of the outlet channel 11 is constituted by two vertical side walls, a horizontal bottom and two walls, each inclined at an angle of 45° from vertical, connecting the bottom and the two side walls, respectively.

In other embodiments, the cross-section of the outlet channel 11 may comprise more than five straight lines being connected at angles more obtuse than the 135° shown in FIG. 5a.

More generally, a more gentle transportation of the solid ingredients being conveyed by the auger conveyor 6 can be obtained by creating a number of longitudinal areas with additional space around the auger 7, for instance by constructing the outlet channel 11 from a number of elongated plane surfaces, each of which is connected to its neighbouring surface(s) at an obtuse angle.

FIG. 5b is a cross-sectional view of an outlet channel 11 of an apparatus 1 according to another embodiment of the invention. In this case, the outlet channel 11 is asymmetric being provided on the inlet side of the auger 7 with a rejector profile 12 extending parallel to the auger 7 in order to prevent solid ingredients from the hopper 5 from being squeezed and damaged when entering the auger conveyor 6.

Furthermore, in the embodiment shown in FIG. 5b, the auger 7 is displaced towards its inlet side, leaving additional space on the other side of the auger 7, which results in a more gentle transportation of the solid ingredients through the outlet channel 11.

FIG. 6a, which is a schematic cross-sectional view of a hopper 5 and an outlet pipe 8 of an apparatus 1 according to an embodiment of the invention, shows how a part 13 of the inner surface of the hopper 5 above the outlet opening is inclined towards the direction of conveyance of the auger conveyor 6, i.e. towards the outlet pipe 8.

This substantially reduces the risk of solid ingredients being stuck and/or damaged at the upper edge of the outlet opening.

FIG. 6b is a schematic top view of the same hopper 5 and outlet pipe 8 as seen in FIG. 6a.

FIG. 7 is a perspective view of a hopper 5 of an apparatus 1 according to an embodiment of the invention as seen from the outlet side. The figure illustrates one way of forming the inclined part 13 of the hopper wall above the outlet opening 11 of the hopper 5.

FIG. 8 is a perspective view of an auger 7 of an apparatus 1 according to an embodiment of the invention. The figure clearly illustrates how the pitch of the auger 7 increases and the diameter of the central core 14 decreases along the direction of conveyance, i.e. from the right to the left in the figure. Especially at one point 15 corresponding to a position within the outlet channel 11 of the hopper 5, there is a local and more significant decrease in the diameter of the central core 14 of the auger 7 as described above.

FIG. 9 is a side view of an apparatus 1 comprising the hopper 5 of FIG. 7 and the auger 7 of FIG. 8. In this figure, it is more clearly seen how a part 13 of the hopper wall over the outlet channel 11 is inclined in the direction of conveyance, and how the most significant decrease of the diameter of the central core 14 of the auger 7 takes place at a point 15 within the outlet channel 11 of the hopper 5.

LIST OF REFERENCE NUMBERS

1. Apparatus for producing frozen ice cream mass with solid ingredients
2. Inlet conduit for ice cream mass
3. Lamella pump
4. Outlet conduit for ice cream mass
5. Hopper
6. Auger conveyor
7. Auger
8. Outlet pipe
9. Undulation profile
10. Top funnel of lamella pump
11. Outlet channel of hopper
12. Rejector profile
13. Inclined part of hopper wall above outlet opening
14. Central core of auger
15. Point of most significant decline of the diameter of the core

The invention claimed is:
1. An apparatus comprising:
a hopper; and
an auger conveyor for conveying solid items,
wherein the auger conveyor comprises an auger and an outlet pipe enclosing the auger along at least a part of the length of the auger, the outlet pipe having an inlet end and an outlet end,
wherein the outlet pipe is mounted at its inlet end to the hopper for receiving the solid items from the hopper through an outlet opening near the bottom of the hopper, and the auger extends partly along at least a part of the bottom of the hopper, partly inside the outlet pipe along substantially the full length thereof, and
wherein an inner surface of the hopper on a side of the hopper towards the outlet pipe comprises an inclined part above the outlet opening that is inclined towards the direction of conveyance of the auger conveyor,
wherein at least along a part of the length of the outlet pipe enclosing the auger, the cross-sectional outline of the inner side of the outlet pipe has a substantially circular shape being superposed by a plurality of undulations, and
wherein the undulations extend parallel to the longitudinal direction of the outlet pipe.

2. An apparatus according to claim 1, where said inclined part of the inner surface of the hopper forms an angle with respect to the vertical in the range from 20° to 88°.

3. An apparatus according to claim 1, wherein the pitch of the auger increases gradually along the direction of conveyance of the auger conveyor.

4. An apparatus according to claim 3, wherein the most significant increase of the pitch of the auger takes place at a point just inside an outlet channel of the hopper.

5. An apparatus according to claim 1, wherein the auger comprises a central core from which one or more helical screw flights extend, and the diameter of the core decreases gradually along the direction of conveyance of the auger conveyor.

6. An apparatus according to claim 5, wherein the most significant decrease of the diameter of the central core of the auger takes place at a point just inside an outlet of the hopper.

7. An apparatus according to claim 1, wherein the undulations are equally spaced around the outlet pipe.

8. An apparatus according to claim 1, wherein the undulations are sinusoidal.

9. An apparatus according to claim 1, wherein the number of undulations is in the range from 2 to 20.

10. An apparatus according to claim 1, wherein the part of the auger extending along at least a part of the bottom of the hopper is placed in an outlet channel, which outlet channel is constituted by a trench extending along the bottom of the hopper and ending at the outlet opening,
wherein the cross-sectional outline of the trench is formed by a number of straight lines, the angle between two neighbouring lines of which is obtuse.

11. An apparatus according to claim 10, wherein the outlet channel is asymmetric and comprises a rejector profile on the inlet side of the auger and extending parallel to the auger.

12. An apparatus according to claim 10, wherein the position of the auger in the outlet channel is displaced towards the inlet side of the auger with respect to the center line of the outlet channel.

13. An apparatus according to claim 1, wherein the outlet pipe at its outlet end is cut off vertically at an angle with respect to the longitudinal direction of the outlet pipe, which angle is in the range from 20° to 80°.

14. An apparatus according to claim 1, wherein the outlet pipe enclosing the auger is made from steel.

15. An apparatus according to claim 1, wherein the apparatus is an apparatus for the production of ice cream mass with solid ingredients.

16. An apparatus according to claim 1, wherein the pitch of the auger increases stepwise along the direction of conveyance of the auger conveyor.

17. An apparatus according to claim 1, wherein the auger comprises a central core from which one or more helical screw flights extend, and the diameter of the core decreases stepwise along the direction of conveyance of the auger conveyor.

* * * * *